United States Patent [19]

Cohen et al.

[11] Patent Number: 4,626,399
[45] Date of Patent: Dec. 2, 1986

[54] LIMITER

[75] Inventors: Samuel A. Cohen, Hopewell; Joel C. Hosea, Princeton; John R. Timberlake, Allentown, all of N.J.

[73] Assignee: The United States of America as represented by the United States Department of Energy, Washington, D.C.

[21] Appl. No.: 662,645

[22] Filed: Oct. 19, 1984

[51] Int. Cl.[4] .............................................. G21B 1/00
[52] U.S. Cl. ................................................... 376/136
[58] Field of Search .................... 376/136; 51/379, 378

[56] References Cited

U.S. PATENT DOCUMENTS

| 2,767,527 | 10/1956 | Guilbert | 51/379 |
| 2,815,618 | 12/1957 | Buliga | 51/379 |
| 2,906,068 | 9/1959 | Porter | 51/379 |
| 3,315,420 | 4/1967 | Moberg | 51/378 |

FOREIGN PATENT DOCUMENTS

| 0066206 | 12/1982 | European Pat. Off. | 376/136 |
| 0050794 | 4/1979 | Japan | 376/136 |
| 838551 | 6/1960 | United Kingdom | 376/136 |

OTHER PUBLICATIONS

7th Symp. on Engineering Problems of Fusion Research, Knoxville, Tenn., 10/77, IEEE Pub. No. 77CH1267-4-NPS, Condolff et al, pp. 260-268.

Primary Examiner—Harvey E. Behrend
Attorney, Agent, or Firm—Gustavo Siller, Jr.; Jeannette M. Walder; Judson R. Hightower

[57] ABSTRACT

A limiter with a specially contoured front face accommodates the various power scrape-off distances $\lambda_p$, which depend on the parallel velocity, $V_\parallel$, of the impacting particles. The front face of the limiter (the plasma-side face) is flat with a central indentation. In addition, the limiter shape is cylindrically symmetric so that the limiter can be rotated for greater heat distribution.

10 Claims, 2 Drawing Figures

LIMITER

CONTRACTUAL ORIGIN OF THE INVENTION

The United States Government has rights in this invention pursuant to Contract No. DE-AC02-76CH03073 between the U.S. Department of Energy and Princeton University.

BACKGROUND OF THE INVENTION

This invention relates generally to limiters for use in fusion devices; and, more particularly to fusion devices employing RF (radiofrequency) heating.

Limiters are used in fusion devices generally to position the plasma away from the vacuum vessel walls, to remove useful heat, and to remove both hydrogen and impurities (pumped limiters). The heat loads in present day tokamaks place stringent requirements on their limiters. Limiters can be expected to receive power loadings in excess of $10^4$ W/cm$^2$ and a total deposited energy greater than $10^5$ Joules. Recently, two plasma materials interactions, which are peculiar to RF heated plasmas, have been discovered to cause detrimental effects to limiters. First, during ICRF heating in the H+ second harmonic and H+ minority regimes, fast ion loss to the plasma edge has been reported (D. M. Manos et al, J. Nucl. Mater. 111 & 112 (1982) 30). Small carbon probes placed in the plasma edge have experienced enhanced erosion attributed to synergistic interaction involving both the bulk plasma and energetic ions. Second, during LHCD experiments on PLT (Princeton Large Torus) by the inventors, small (~1 cm$^2$) incandescent hot spots have been observed on the limiters. These hot spots have been attributed to energetic electron impact and result in a carbon influx into the plasma which quenches the current drive.

The higher the $V_{\parallel}$ (parallel velocity) of a species in the plasma, the shorter its scrape-off distance. For electrons of 100 keV parallel energy, the scrape-off distance is about 0.1 cm. This results in a concentrated heat load by the lost energetic electrons on the part of the limiter nearest the plasma edge.

Current limiter designs include the so-called "mushroom" shaped limiter and the rotating disk limiter. The mushroom-shaped limiters have either a concave or convex front face (the portion of the limiter closest to the plasma). The disk-shaped limiter positions the disk edge closest to the plasma. Both types of limiter employ rotation (the mushroom limiter rotating about its "stem" and the disk about its center) to distribute heat loads. The major disadvantages of the convex mushroom limiter are: inadequate ballistic reflection of the incident plasma and inability to handle power loads due to relativistic electrons. The major disadvantages of the concave mushroom limiter are: inadequate heat load distribution to the main limiter mass and inadequate surface area accepting the heat flux. The major disadvantages of the disk limiter are: lack of compactness and inadequate reflection of the incident plasma.

Therefore it is an object of the present invention to provide a limiter than can handle high power fluxes and prevent the evolution of hot spots.

It is another object of the present invention to provide a limiter suitable for use in a RF heating environment and that can effectuate hydrogen removal and impurity control.

It is yet another object of the present invention to provide a limiter capable of bearing the high heat load due to near relativistic electrons and suprathermal ions.

Additional objects, advantages, and novel features of the invention will be set forth in part in the description which follows, and in part will become apparent to those skilled in the art upon examination of the following or may be learned by practice of the invention.

SUMMARY OF THE INVENTION

To achieve the foregoing and other objects and in accordance with the purposes of the invention, a limiter with a specially contoured front face is provided. The front face of the limiter (the plasma-side face) is flat with a central indentation. In addition, the limiter shape is cylindrically symmetric so that the limiter can be rotated for greater heat distribution. This limiter shape accommodates the various power scrape-off distances $\lambda_p$, which depend on the parallel velocity, $V_{\parallel}$, of the impacting particles.

BRIEF DESCRIPTION OF THE DRAWINGS

The present invention is illustrated in the accompanying drawings wherein.

DETAILED DESCRIPTION OF THE INVENTION

Figure 2:
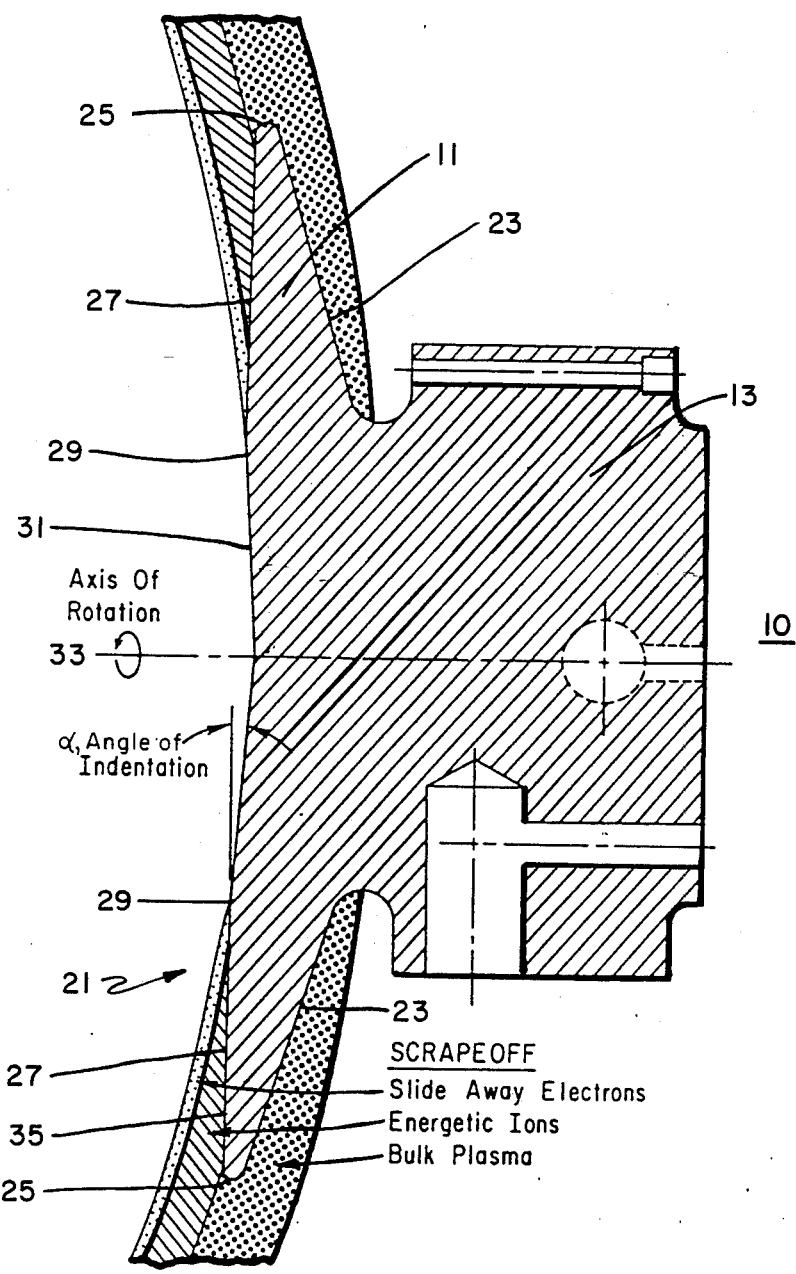
FIG. 2 is a detail of the limiter shown in FIG. 1.

Referring to FIG. 2, limiter 10 is shown in cross-section. Here limiter 10 is shown as a rotatable pump limiter. The blade portion of limiter 10 is a figure of revolution (i.e. cylindrically symmetric) about axis 33. The blade portion 11 is bound by front face 21 and back face 23. The blade portion 11 is the critical portion of the limiter in that the blade portion is subject to the greatest heat and particle loading. Front face 21 consists of flat portion 27 (perpendicular to axis 33) and indented portion 31. The degree of indentation is determined by the angle of indentation, $\gamma$. The angle of indentation will preferably vary from 1°-20°, depending on the size of the limiter (smaller limiters having generally greater angle of indentation than larger limiters). In this embodiment, $\gamma \simeq 5°$ and the indentation is a conic surface. FIG. 2 also shows the location of the limiter blade as it would be positioned in the scrape-off region. The scrape-off region consists of runaway or slide away energetic electrons, energetic ions, and bulk plasma. Generally, runaway electrons have $\lambda_p = 1$ mm, energetic ions have $\lambda_p \simeq 3$ mm, and bulk plasma has $\lambda_p \simeq 10$ mm. As can be seen from FIG. 2, runaway electrons impact the limiter at the vertex of 27 and 31, which is labeled 29 on front face 21 (the indented portion of the front face). The impact location is actually spread out $\sim \pm 1$ cm due to $\lambda_p$ and the toroidal and poloidal curvature of the tokamak. Energetic ions impact on the flat portion 27 of the front face and in the indentation. Bulk plasma deposits about a quarter of its power on the entire front face and the rest on the back face (23). The "leading edge" (the point of highest power density) is different for each species: point 29 for runaway electrons, point 35 for energetic ions, and point 25 for bulk plasma. Back face 23 is conically shaped outward. The front face receives the power loading and the back face the particle loading.

To reduce the temperature rise on a small area of the limiter the plasma could be moved thus shifting the tangency point. However, since moving the plasma alters the RF coupling, moving the limiter is more successful. The limiter shape herein is specially tailored such that the plasma tangency point is near the limiter circumference. Then, for example, by rotating the limiter about axis 33, the heat load can be readily distributed over a larger area.

Figure 1:
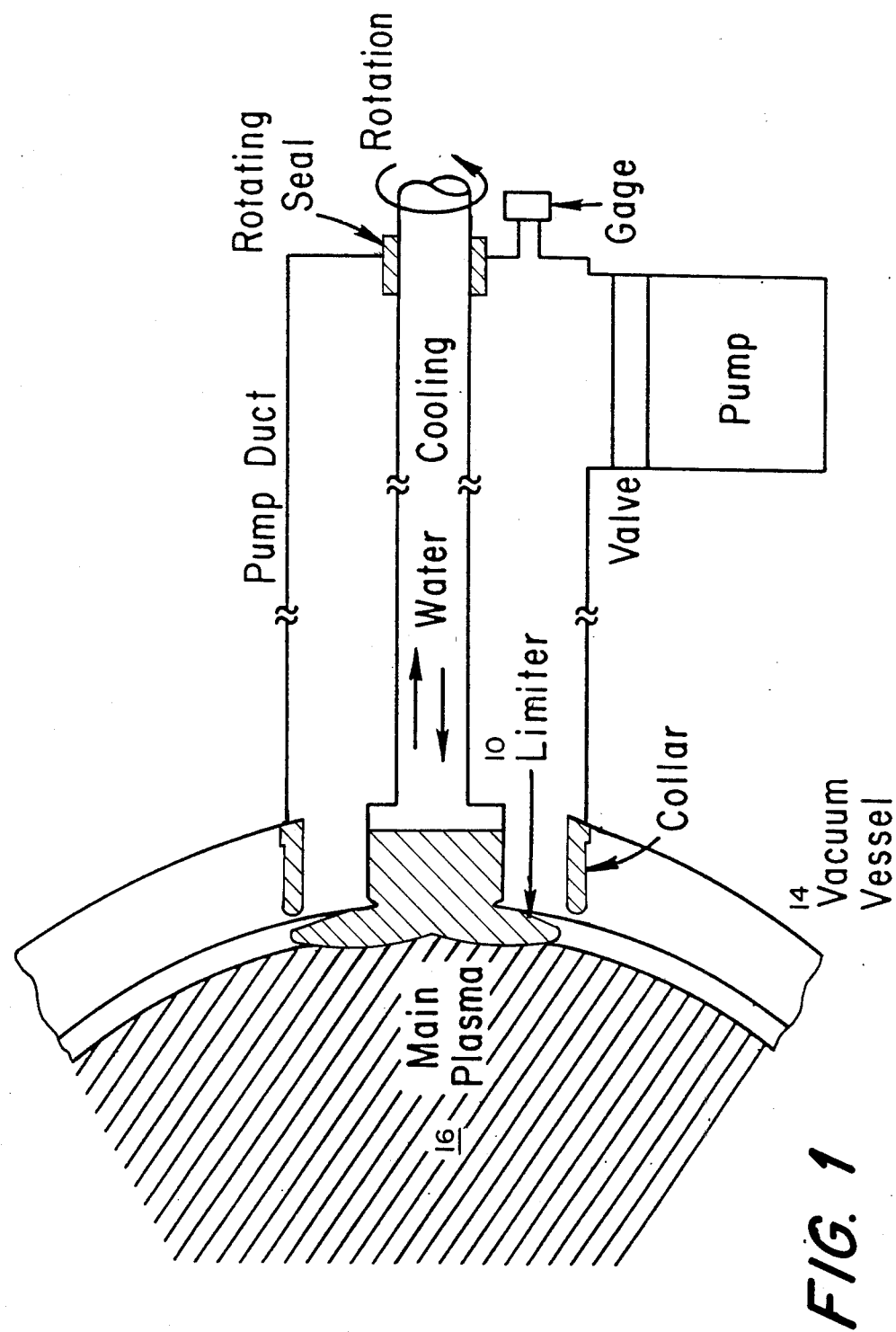
FIG. 1 is a schematic of a limiter as it would be mounted to the vacuum vessel.

The body portion 13 of the limiter provides for support, thermal inertia, heat removal, and cooling. Depending on the material chosen for the limiter, the limiter may act as a sponge absorbing most of the incident hydrogen, or as a wall, reflecting or reemitting nearly all the incident hydrogen. Referring to FIG. 1, limiter 10 is shown as it would be positioned on a toroidal vacuum vessel 14, near the main plasma 16. Suitable materials for the reflecting-type limiter are carbides (such as graphite), molybdenum, tungsten, or any other refractory material. Graphite is the material of choice because of its low Z, excellent thermal properties, and ease of manufacture. Suitable materials for the absorbing limiter are hydride forming materials such as titanium.

EXAMPLE

The limiter of FIG. 2 was installed on PLT. Operation in PLT during ohmic discharges proved the ability of the limiter to reduce localized heating caused by energetic electron bombardment and to remove about 2% of the ions lost to the vessel walls and other limiters (non-pumping).

One major change in the preparation of this limiter was in its conditioning. Subsequent to its machining and vacuum bake at 1100° C., it was mounted on its water-cooled support and placed in an ion-beam line. There it was irradiated, head-on, by fifty-five, 200 ms duration, 1 MW hydrogen ion beam shots. The beam diameter was about 12 cm. The peak limiter surface temperature rose beyond 2000° C. and bulk achieved T>600° C. During the beam shots the limiter face sparkled with hundreds of hot spots presumably due to crystallites having poor thermal contact. The frequency of the sparkling was nearly the same in the last beam shot as it was in the first.

The limiter is rotated by means of a shaft connected to a hollow ferrofluidic feedthrough located at the end of the pump duct. A vespel bushing, on a spider assembly located near the limiter, acts as the second bearing support for the shaft. The hollow shaft allows water cooling tubes and electrical wiring to be brought to the limiter. stepping motor drives the shaft at speeds up to 2 RPS, the limit being due to the motor torque.

A segmented graphite collar (fixed at a tokamak minor radius of r=42 cm) surrounds the limiter to restrict gas conductance back into the tokamak. The limiter is movable in and out of the tokamak via a bellows assembly at the ferrofluidic feedthrough. With the limiter fully retracted to r=45 cm, the conductance back into the machine for $D_2$ is 400 l/s, and the conductance down the pump is 720 l/s at $0.1 < P < 1\mu$. Pressures are measured by a Shultz Phelps gage which has been calibrated against a capacitance manometer. Both gages are located 2 m from the vacuum vessel at the far end of the pump duct. The time constant of the Shultz Phelps gage is ~1 ms.

The collection efficiency of the limiter has been modelled with a 2-d ballistic calculation. For a 2 cm flux scrape-off distance, the amount of ion flux "trapped" by the limiter/collar arrangement is 50% of that incident for a limiter position 5 cm beyond the collar, $r_\delta = r_c - r_l$.

The limiter thermal response has been modelled using a finite element, 3-d code. The main finding is that the limiter can handle ~2 kW/cm² for ~1 sec before the limiter surface temperature exceeds 2000° C. This corresponds to about 1 MW distributed uniformly over the limiter's front and back faces.

The hot areas have been spread out by rotating the limiter. The peak temperature has dropped about a factor of two. A larger improvement is expected for the localized hot spots generated in lower hybrid experiments.

The above description and example of preferred embodiments of this invention is given by way of example only and it should be understood that numerous modifications could be made therein without departing from the scope of this invention as claimed in the following claims.

The embodiments of this invention in which an exclusive property or privilege is claimed are defined as follows:

1. In a nuclear fusion vacuum vessel having an inner wall; a scrape-off region which includes a bulk plasma, energetic ions, and slide away electrons; an improved limiter, cylindrically symetrical about an axis and rotatable about said axis, said limiter having a front face and a back face, said front face having an annular flat portion covering a major portion of said front face, an indented portion and a vertex therebetween, said vertex forming a leading edge for said slide away electrons, whereby the heat load absorbed by said limiter is distributed thereon upon rotation thereof.

2. The limiter of claim 1 wherein said indented portion is a conic surface.

3. The limiter of claim 2 wherein said back face is conically shaped outward.

4. The limiter of claim 2 wherein said indented portion is indented from 1°-20° from the flat portion.

5. The limiter of claim 3 wherein said limiter is formed of a refractory material.

6. The limiter of claim 3 wherein said limiter is formed of a material selected from the group consisting of carbides, molybdenum, and tungsten.

7. The limiter of claim 3 wherein said limiter is formed of a hydride forming material.

8. The limiter of claim 3 wherein said limiter is formed of titanium.

9. In a nuclear fusion vacuum vessel having an inner wall; a scrape-off region which includes a bulk plasma, energetic ions, and slide away electrons; an improved pumped limiter, cylindrically symmetrical about an axis and rotatable about said axis, said pumped limiter having a front face and a back face, said front face having an annular flat portion covering a major portion of said front face, an indented portion and a vertex therebetween, said vertex forming a leading edge for said slide away electrons, whereby the heat load absorbed by said limiter is distributed thereon upon rotation thereof.

10. The limiter of claim 9 wherein said indented portion is a conic surface.

* * * * *